United States Patent [19]

Gutleber

[11] Patent Number: 4,472,814
[45] Date of Patent: Sep. 18, 1984

[54] CW INTERFERENCE CANCELLING SYSTEM FOR SPREAD SPECTRUM SIGNALS

[75] Inventor: Frank S. Gutleber, Little Silver, N.J.

[73] Assignee: The United States of America as represented by the Secretary of the Army, Washington, D.C.

[21] Appl. No.: 413,953

[22] Filed: Sep. 1, 1982

[51] Int. Cl.³ .......................... H04B 1/10; H04J 13/00
[52] U.S. Cl. ........................................ 375/34; 375/96; 375/102; 370/18
[58] Field of Search .................................. 370/18–22, 370/53, 69.1, 77, 85, 104, 116; 375/1, 25, 38, 96, 102–104, 34; 340/346, 348, 349; 455/206, 284, 303–306; 364/604, 725, 728, 819, 826

[56] References Cited

U.S. PATENT DOCUMENTS

| 3,461,451 | 7/1969 | Gutleber | 340/348 |
| 3,634,765 | 1/1972 | Gutleber | 375/96 X |
| 3,870,996 | 3/1975 | Miller | 375/102 |
| 3,908,088 | 9/1975 | Gutleber | 370/104 |
| 4,027,264 | 5/1977 | Gutleber | 455/306 X |
| 4,325,068 | 4/1982 | Mercer | 455/304 X |

OTHER PUBLICATIONS

Weik, Martin H., *Communications Standard Dictionary*, Van Nostrand Reinhold Company, 1983, pp. 56, 200.

Primary Examiner—Robert L. Griffin
Assistant Examiner—Albert W. Watkins
Attorney, Agent, or Firm—Anthony T. Lane; Sheldon Kanars; Jeremiah G. Murray

[57] ABSTRACT

Substantially complete cancellation of continuous wave or slowly varying continuous wave interference with no loss in the received level of the desired signals is provided for a spread spectrum system which utilizes orthogonal multiplexed noise codes which when orthogonally multiplexed, detected in a matched filter detector and linearly added, compress to a lobeless impulse. The noise codes are comprised of binary digital noise codes which compress to a code bit width $\tau$. The CW interference is eliminated by means of a variable delay line and a linear adder. The delay line operates to provide an interference signal from the input interference signal which is exactly 180° out of phase with respect to the input interference signal. By adding the delayed signal to the input signal in the linear adder, a total cancellation of the interference signal occurs while the signal level of the noise coded communications signal remains unchanged.

2 Claims, 7 Drawing Figures

CW INTERFERENCE CANCELLING SYSTEM FOR SPREAD SPECTRUM SIGNALS

The invention described herein may be manufactured, used and licensed by or for the Government for governmental purposes without the payment to me of any royalties thereon.

CROSS REFERENCE TO RELATED APPLICATIONS

This application is related to the following applications:

U.S. Ser. No. 423,751, entitled, "Pulse Interference Cancelling System For Spread Spectrum Signals", filed in the name of Frank S. Gutleber, on Sept. 27, 1982.

U.S. Ser. No. 433,761, entitled, "CW Interference Cancelling System Spread Spectrum Signals Utilizing Active Coherent Detection", filed in the name of Frank S. Gutleber, on Oct. 12, 1982.

U.S. Ser. No. 434,668, entitled, "Pulse Interference Cancelling System For Spread Spectrum Signals Utilizing Active Coherent Detection", filed in the name of Frank S. Gutleber, on Oct. 15, 1982.

FIELD OF THE INVENTION

This invention relates generally to noise code communication systems and more particularly to a continuous wave or slowly varying continuous wave interference cancelling system therefor.

BACKGROUND OF THE INVENTION

As is well known and understood, perhaps the most common method of reducing continuous wave (CW) interference is through the use of bandpass notch filters. However, as applied in audio communications systems and particularly in defense communication systems, the use of such filters have certain inherent limitations. For example, relatively large and, therefore, expensive inductors and capacitors are required for passive, low frequency filtering. Additionally, the filtering also tends to distort the voice signal and thus deteriorates its intelligibility. Furthermore, the filtering is done around a preset frequency which permits the signal to be jammed merely by changing frequencies.

One known type of interference cancelling system is shown and described in U.S. Pat. No. 4,027,264, entitled, "Phase Lock Loop Multi-tone Interference Cancelling System", issued to Frank S. Gutleber, the present inventor, on May 31, 1977. The interference cancelling system of that invention employs a phase lock loop which is utilized as a narrow band tracking filter to adaptively lock to interference tones to be cancelled by a process of signal subtraction.

As noted above, the present invention relates to communication systems utilizing noise coded signals. Such systems, furthermore, are well known and are particularly desirable because they exhibit an immunity against self-interference and jamming. Noise coded means that the information is coded with a code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity at all other times. When the code mates, for example, are multiplexed, matched filter detected and linearly added, there is provided a lobeless impulse output of a relatively high amplitude at a given time and a zero output at all other times. Such codes and systems utilizing such codes are typically shown and described in U.S. Pat. No. 3,461,451, entitled, "Code Generator To Produce Permutations of Code Mates", which issued to F. S. Gutleber on Aug. 12, 1969; U.S. Pat. No. 3,634,765, entitled, "Systems to Provide An Impulse Autocorrelation Function . . . Of One Or More Of Said Code Signals", which issued to F. S. Gutleber on Jan. 11, 1972; and U.S. Pat. No. 3,908,088, entitled, "Time Division Multiple Access Communication System", which issued to F. S. Gutleber on Sept. 23, 1975.

SUMMARY OF THE INVENTION

Accordingly, it is an object of the present invention to provide an improved noise coded communication system.

Another object of the present invention is to provide an improved noise coded communication system which eliminates continuous wave or slowly varying continuous wave interferring signals.

Still another object of the present invention is to provide an improved noise coded communication system which totally eliminates continuous wave or slowly varying continuous wave interference while experiencing no loss and substantially no degradation of the desired signal.

And yet another object of the present invention is to provide a CW canceller for noise coded communication systems which is relatively small in size, weight and extremely low in cost.

Accordingly, these and other objects are achieved by means of a variable delay line and a linear adder coupled to the receiver output of a multiplexed noise coded transceiver. The noise code comprises a multi-bit binary code having a code bit width $\tau$ and which upon matched filter detection compresses to an impulse having a width $\tau$. The variable delay line provides a delay whose order of magnitude is substantially equal to $\tau$ but is further varied until the phase of the interference signal is exactly 180° out of phase with respect to the phase of the interference signal received. The inverted and non-inverted interference signals are added together in the linear adder whereupon the interference signals are cancelled. The noise coded signal, however, remains unchanged except that the compressed code bit duration doubles during matched filter detection.

DETAILED DESCRIPTION OF THE PREFERRED EMBODIMENT

Figure 1:
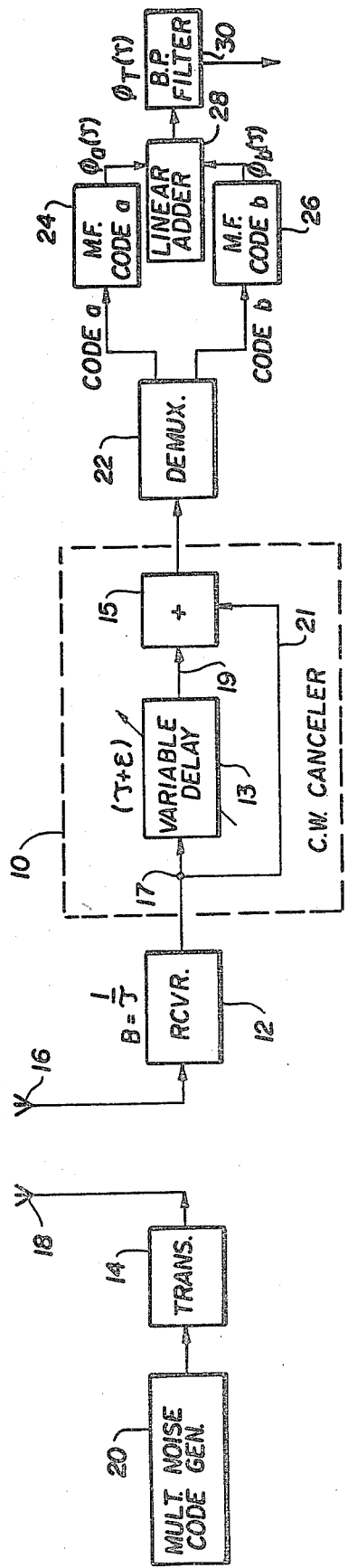
FIG. 1 is a functional block diagram of a noise coded communication link utilizing the CW interference canceller according to the subject invention.
Figure 2:
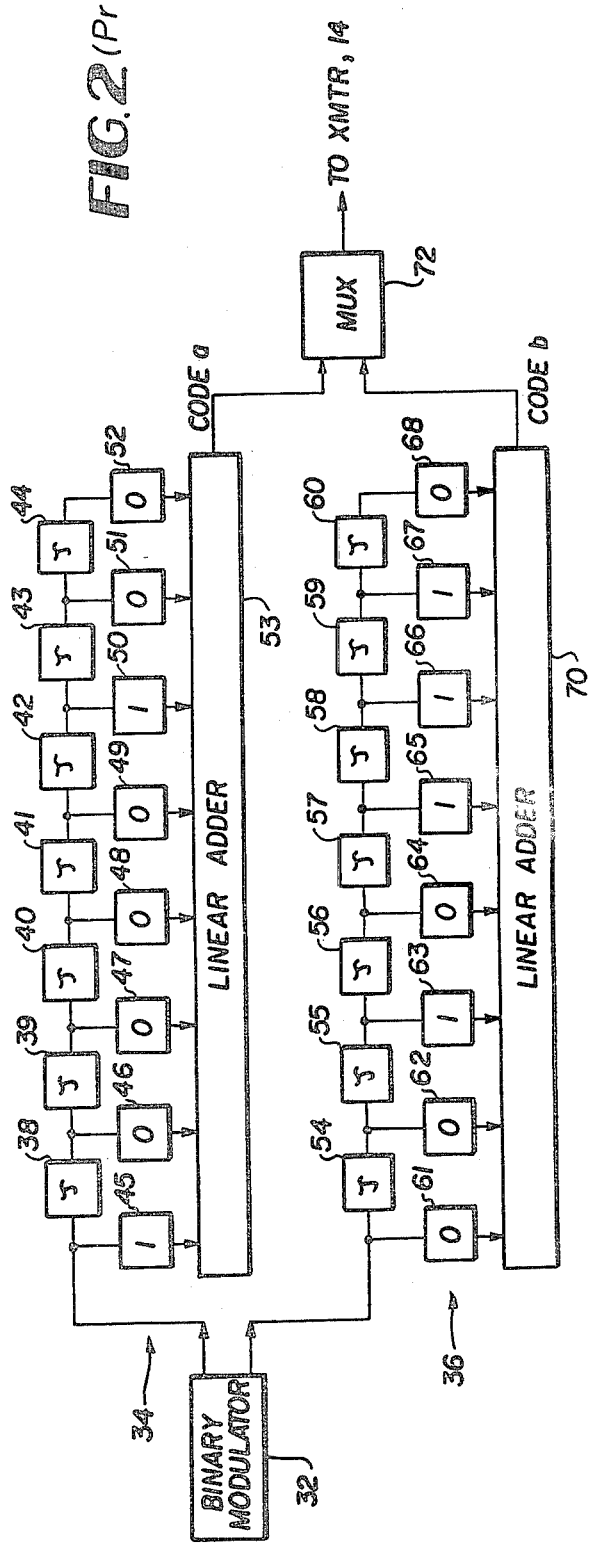
FIG. 2 is a functional block diagram illustrative of a multiplexed noise code generator utilized in the communications link shown in FIG. 1.

Referring now to the drawings and more particularly to FIG. 1, reference numeral 10 denotes a passive continuous wave (CW) interference canceller which is coupled to the output of a receiver 12 which receives a noise coded transmission from a transmitter 14. The communications link comprises a wireless system including transmitting and receiving antennas 16 and 18 respectively coupled to the transmitter and receiver 12 and 14. The input to the transmitter 14, moreover, is coupled to a multiplexed noise code generator 20, the details of which are shown in FIG. 2, and which generates a particular type of noise code which comprises a class of codes formed with code mate pairs that compress to a lobeless impulse upon matched filter detection and linear addition and as such are of the type shown and described in the aforementioned U.S. Pat. Nos. 3,461,451 and 3,634,765. Multiplexed noise codes that compress to an impulse autocorrelation function, i.e. a single impulse containing no side lobes, is achieved by utilizing code mate pairs that meet the following conditions, namely that the autocorrelation function of the two codes forming a mate pair must be of equal magnitude and opposite sense for all values of time outside of the main lobe. Expressed mathematically for a code mate pair a and b, $$\phi_a(\tau) = -\phi_b(\tau)$$

for all $\tau \neq 0$, where $\phi_a(\tau)$ is the autocorrelation function of code a and $\phi_b(\tau)$ is the autocorrelation function of code b. When two codes meet this requirement, then the simple linear sum of their orthogonally multiplexed and detected outputs by means of a matched filter, for example, results in compressing the composite code structure into a single impulse.

Accordingly, as shown in FIG. 1, a code mate pair transmitted from the multiplexed noise code generator 20 via the transmitter 18 is demultiplexed by a demultiplexer 22 shown coupled to the output of the CW canceller 10. The output of the demultiplexer 22 comprises separate multi-bit digital code mate signals corresponding to the above mentioned code a and code b. The coded signals are coupled to respective matched filters 24 and 26 which are functionally illustrated in FIGS. 3 and 4. The matched filters 24 and 26 respectively output the autocorrelation functions $\phi_a(\tau)$ and $\phi_b(\tau)$ which are coupled to a linear adder 28. The linear adder 28 provides a lobeless impulse output $\phi_T(\tau)$ which is then coupled into a bandpass filter 30.

Prior to considering the operation of the CW canceller 10, reference will first be made to FIGS. 2, 3 and 4 which are intended to illustrate the manner in which two 8-bit multiplexed noise codes a and b which comprise a code mate pair are generated and detected in matched filters.

Consider, for example, a code mate pair wherein code a=10000100 while code b=00101110 and, where 0 indicates a plus polarity signal of unit amplitude and 1 indicates a minus polarity signal of unit amplitude. As shown in FIG. 2, a binary modulator 32 couples to a pair of binary multi-bit code generators 34 and 36. Code generator 34 generates code a and is comprised of seven time delay circuits 38, 40, 42, 44, 46, 48 and 50 as well as eight phase control circuits 52, 54, 56, 58, 60, 62, 64, and 66, which couple to a linear adder 68. The "1" or "0" associated with these phase control circuits signify a phase operation where the "1" signifies a phase reversal of 180° while a "0" signifies no phase reversal or 0° phase shift. The time delay circuits 38 . . . 50 are adapted to provide a time delay ($\tau$) of one code bit width. In a like manner, code b is generated by means of the seven time delay circuits 54, 55, 56, 57, 58, 59 and 60 as well as the eight phase control circuits 61, 62, 63, 64, 65, 66, 67 and 68 which couple into the linear adder 70. Further as shown, both linear adders 53 and 70 couple to a multiplexer 72 which connects to the transmitter 14 shown in FIG. 1.

Figure 3:
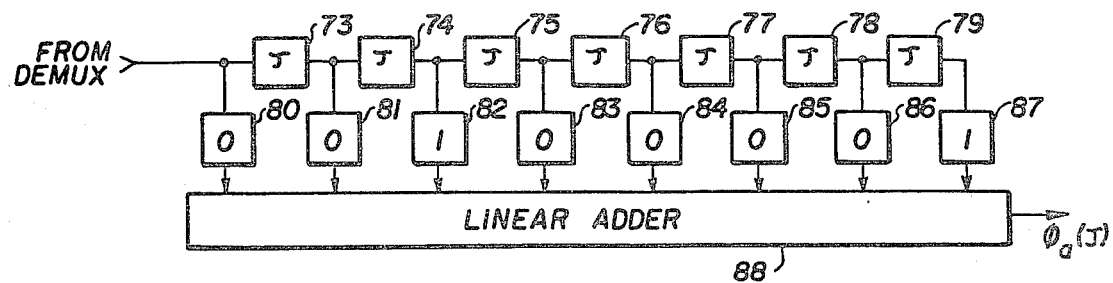
FIGS. 3 and 4 are functional block diagrams illustrative of matched filters for the two multiplexed noise codes generated by the noise code generator shown in FIG. 2.
Figure 4:
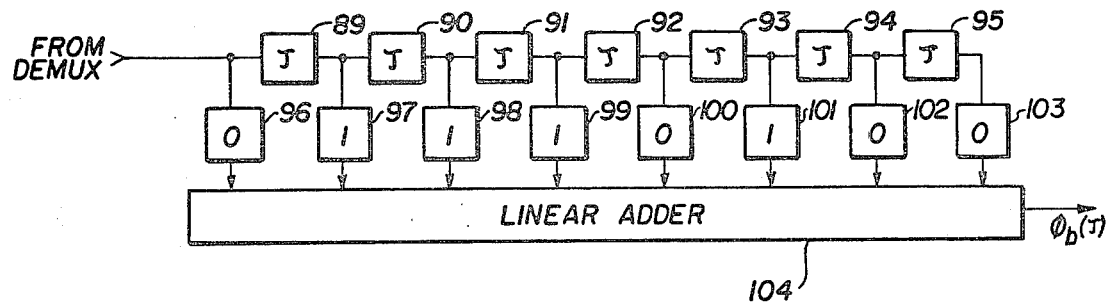

Referring now to FIGS. 3 and 4, the matched filters 24 and 26 for codes a and b respectively include a set of phase control circuits having a sequence which is an inversion of the codes a and b. Accordingly, the matched filter 24 provides an inversion sequence of 00100001 for code a, while the matched filter 26 provides an inversion sequence of 01110100 for code b. As shown in FIG. 3, the matched filter 24 is comprised of time delay circuits 73, 74, 75, 76, 77, 78 and 79 along with phase control circuits 80, 81, 82, 83, 84, 85, 86 and 87 coupled to a linear adder 88. The matched filter 26 for code b as shown in FIG. 4 is comprised of the time delay circuits 89, 90, 91, 92, 93, 94 and 95 as well as the phase control circuits 96, 97, 98, 99, 100, 101, 102 and 103 coupled to the linear adder 104.

Referring now back to FIG. 1 and considering now the CW noise canceller 10, it is shown comprised of a variable time delay circuit 13 such as a delay line and a linear adder 15. The variable delay is of an order of magnitude which is equal to the compressed code bit width $\tau$ but is additionally able to provide a vernier phase shift of $\epsilon$ in order that any CW interference signal appearing at the output of the receiver 12 and at circuit node 17 will be shifted in phase exactly 180°. The 180° shifted CW interference signal, appearing for example on circuit lead 19, is applied to one input of the linear adder 15, while the CW interference signal having no phase shift is coupled to the other input of the linear adder by means of a circuit lead 21 coupled to circuit junction 17. Adding the two CW signals which are mutually 180° out of phase will effect a cancellation of the CW interference signal while the noise coded signal will remain substantially unchanged with the exception that a doubling of the compressed code bit duration ($\tau$) will occur.

Figure 5A:
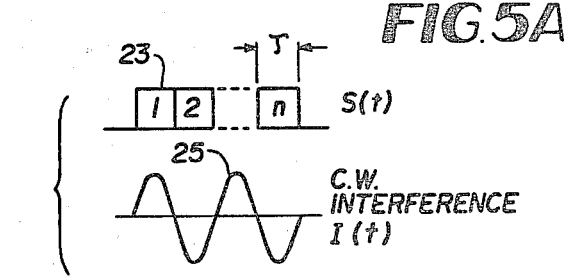
FIGS. 5A through 5C are a set of diagrams helpful in understanding the operation of the subject invention.
Figure 5B:
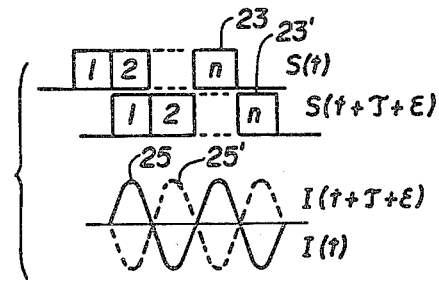
Figure 5C:
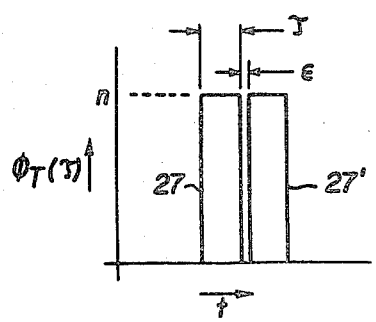

This operation is further illustrated in FIGS. 5A, 5B and 5C. Referring first to FIG. 5A, reference numeral 23 denotes a multiplexed noise code signal s(t) of n bits having a width of $\tau$ which is sensed by the receiver 12 along with a CW interference signal I(t) shown by reference numeral 25. The receiver 12 which according to conventional practice is adapted to have a bandwidth substantially equal to 1/$\tau$, translates these signals to CW canceller 10 and more particularly to circuit junction 17. The output of the linear adder 15 is shown in FIG. 5B and constitutes two noise codes s(t) and s(t+$\tau$+$\epsilon$) which are designated by reference numerals 23 and 23', the latter being delayed by a time $\tau$+$\epsilon$. The delayed code 23' is simply code 23 fed through the variable time delay circuit 13. However, FIG. 5B also indicates that as a result of the time delay circuit 13 there exists two interference signals I(t) and I(t+$\tau$+$\epsilon$) as evidenced by reference numerals 25 and 25' and which constitute signals on circuit leads 21 and 19, respectively. Because I(t) and I(t+$\tau$+$\epsilon$) are mutually 180° out of phase when added together, they will cancel one another. Accordingly, the CW canceller circuit 10 will operate to eliminate the CW interference signal I(t) 25 which is coupled to the demultiplexer 22.

With reference now to FIG. 5C, there is shown diagrammatically the impulse correlation function provided by two multiplexed noise codes 23 and 23' as shown by reference numerals 27 and 27′. The reason that a doubling of the output impulse pulsewidth occurs is due to the fact that the impulse autocorrelation function occurs at the nth pulse, as will be demonstrated subsequently, and since the two multiplexed noise codes 23 and 23′ as shown in FIG. 5B are displaced by a pulsewidth $\tau$ then the composite impulse autocorrelation function $\phi_T(\tau)$ will be equal to $2\tau+\epsilon$. However, the output peak signal level remains unchanged.

The retention of the signal level is readily demonstrated as follows. Where, for example, code a=10000100 and code b=00101110, compressing code a in matched filter 24, providing an inversion sequence of 00100001, in absence of the interference canceller 10 results in an autocorrelation output $\phi_a(\tau)$ as,

| bit time slot # | 1 2 3 4 5 6 7 8 9 10 11 12 13 14 15 |
|---|---|
| Inv. 0 | 1 0 0 0 0 1 0 0 |
| Seq. 0 | 1 0 0 0 0 1 0 0 |
| 1 | 0 1 1 1 1 0 1 1 |
| 0 | 1 0 0 0 0 1 0 0 |
| 0 | 1 0 0 0 0 1 0 0 |
| 0 | 1 0 0 0 0 1 0 0 |
| 0 | 1 0 0 0 0 1 0 0 |
| 1 | 0 1 1 1 1 0 1 1 |
| $\phi_a(\tau) =$ | 1 . 0³ . 0 . 0 0⁸ 0 . 0 . 0³ . 1 |

The exponent indicates the amplitude of the signal while the dot represents a zero amplitude.

Compressing code b in matched filter 26, providing an inversion sequence of 01110100, in absence of the interference canceller 10 yields an autocorrelation output $\phi_b(\tau)$ as,

| bit time slot # | 1 2 3 4 5 6 7 8 9 10 11 12 13 14 15 |
|---|---|
| Inv. 0 | 0 0 1 0 1 1 1 0 |
| Seq. 1 | 1 1 0 1 0 0 0 1 |
| 1 | 1 1 0 1 0 0 0 1 |
| 1 | 1 1 0 1 0 0 0 1 |
| 0 | 0 0 1 0 1 1 1 0 |
| 1 | 1 1 0 1 0 0 0 1 |
| 0 | 0 0 1 0 1 1 1 0 |
| 0 | 0 0 1 0 1 1 1 0 |
| $\phi_b(\tau) =$ | 0 . 1³ . 1 . 1 0⁸ 1 . 1 . 1³ . 0 |

The composite compressed output consists of the linear addition of $\phi_a(\tau)$ and $\phi_b(\tau)$ in linear adder 28 which produces a lobeless impulse signal $\phi_T(\tau)$ shown below as,

| bit time slot # | 1 2 3 4 5 6 7 8 9 10 11 12 13 14 15 |
|---|---|
| $\phi_a(\tau)$ | 1 . 0³ . 0 . 0 0⁸ 0 . 0 . 0³ . 1 |
| $\phi_b(\tau)$ | 0 . 1³ . 1 . 1 0⁸ 1 . 1 . 1³ . 0 |
| $\phi_T(\tau) =$ | . . . . . . . 0¹⁶ . . . . . . . |

When the interference canceller 10 is interposed between the output of the receiver 12 and the input to matched filter 24 following the demultiplexer 22 and providing a delay equal to 1 code bit width ($\tau$), the input signal for code a becomes,

| a(t) | 1 0 0 0 0 1 0 0 |
|---|---|
| a(t + $\tau$) | 1 0 0 0 0 1 0 0 |
| $\Sigma_a =$ | 1 . 0² 0² 0² . . 0² 0 |

The input signal for code b becomes,

| b(t) | 0 0 1 0 1 1 1 0 |
|---|---|
| b(t + $\tau$) | 0 0 1 0 1 1 1 0 |
| $\Sigma_b =$ | 0 0² . . . 1² 1² . 0 |

Compressing the summed code a signal $\epsilon_a$ in its matched filter results in $\phi'_a(\tau)$ being generated as shown below,

| bit time slot # | 1 2 3 4 5 6 7 8 9 10 11 12 13 14 15 |
|---|---|
| Inv. 0 | 1 . 0² 0² 0² . . 0² 0 |
| Seq. 0 | 1 . 0² 0² 0² . . 0² 0 |
| 1 | 0 . 1² 1² 1² . . 1² 1 |
| 0 | 1 . 0² 0² 0² . . 0² 0 |
| 0 | 1 . 0² 0² 0² . . 0² 0 |
| 0 | 1 . 0² 0² 0² . . 0² 0 |
| 0 | 1 . 0² 0² 0² . . 0² 0 |
| 1 | 0 . 1² 1² 1² . . 1² 1 |
| $\phi_a'(\tau) =$ | 1 1 0³ 0³ 0 0 0 0 0⁹ 0⁹ 0 0 0 0³ 0³ 1 1 |

Compressing the summed code b signal $\epsilon_b$ in its matched filter 26 results in $\phi'_b(\tau)$ being generated as shown below,

| bit time slot # | 1 2 3 4 5 6 7 8 9 10 11 12 13 14 15 |
|---|---|
| Inv. 0 | 0 0² . . . 1² 1² . 0 |
| Seq. 1 | 1 1² . . . 0² 0² . 1 |
| 1 | 1 1² . . . 0² 0² . 1 |
| 1 | 1 1² . . . 0² 0² . 1 |
| 0 | 0 0² . . . 1² 1² . 0 |
| 1 | 1 1² . . . 0² 0² . 1 |
| 0 | 0 0² . . . 1² 1² . 0 |
| 0 | 0 0² . . . 1² 1² . 0 |
| $\phi_b'(\tau) =$ | 0 0 1³ 1³ 1 1 1 0⁷ 0⁷ 1 1 1 1 1³ 1³ 0 | which results in the following composite output $\phi'_T(\tau)$ being formed as,

| bit time slot | 1 2 3 4 5 6 7 8 9 10 11 12 13 14 15 |
|---|---|
| $\phi_a'(\tau)$ | 1 1 0³ 0³ 0 0 0 0⁹ 0⁹ 0 0 0 0³ 0³ 1 1 |
| $+\phi_b'(\tau)$ | 0 0 1³ 1³ 1 1 1 0⁷ 0⁷ 1 1 1 1 1³ 1³ 0 0 |
| $\phi_T'(\tau) =$ | . . . . . . . 0¹⁶ 0¹⁶ . . . . . . . |

It is to be noted that the peak value of the signal $\phi'_T(\tau)$ remains at a level of 16, the same as without the interposed interference canceller 10, i.e. $\phi_T(\tau)$; however, the pulsewidth of the main lobe doubles as shown in FIG. 5C. The compressed pulse nevertheless still remains lobeless.

The additional vernier delay $\epsilon$ represents a small additional increment that is much less than $\tau$ and is employed to render the CW interference 180° out of phase with the input as noted above. That this would not change the above result can be demonstrated by adding a fractional part of the pulsewidth to the delay $\tau$. Consider a delay ($\tau+\epsilon$) equal to $1.5\tau$ for the aforementioned code pairs a and b. Where, for example, each code bit of $\tau$ width is now shown comprised of 2 bits to facilitate demonstrating the effect of a 1.5 bit delay ($\epsilon=0.5\tau$), the code a signal becomes,

| a(t)          | 1 1 0 0 0 0 0 0 0 0 1 1 0 0 0 0 |
|---------------|-----------------------------------|
| a(t + 1.5τ)   | 1 1 0 0 0 0 0 0 0 0 1 1 0 0 0 0 |
| $\Sigma_a =$  | 1 1 0 . . $0^2\ 0^2\ 0^2\ 0^2\ 0^2$ . . . $0^2$ . . $0^2$ 0 0 0 | and the code b signal becomes

| | $\mid\leftarrow\tau\rightarrow\mid$ |
|---|---|
| b(t)         | 0 0 0 0 1 1 0 0 1 1 1 1 1 1 0 0 |
| b(t + 1.5τ)  | 0 0 0 0 1 1 0 0 1 1 1 1 1 1 0 0 |
| $\Sigma_b =$ | 0 0 0 $0^2$ . . $0^2$ . $1^2$ . . $1^2\ 1^2\ 1^2$ . . 1 0 0 |

Compressing the summed code a signal $\epsilon_a$ in its matched filter 24 results in $\phi_a(\tau)$ being provided as,

| bit time slot # | 1 | 2 | 3 | . . . . . . . . . . . . . . . . . . . . . . . . . . . . . . . . . . . . 15 |
|---|---|---|---|---|
| Inv. 0 | 1 1 0 . | $0^2\ 0^2\ 0^2\ 0^2\ 0^2$ . . $0^2$ . . $0^2$ 0 0 0 | | |
| Seq. 0 | | 1 1 0 . . $0^2\ 0^2\ 0^2\ 0^2\ 0^2$ . . $0^2$ . . $0^2$ 0 0 0 | | |
| 1 | | 0 0 1 . . $1^2\ 1^2\ 1^2\ 1^2\ 1^2$ . . $1^2$ . . $1^2$ 1 1 1 | | |
| 0 | | | 1 1 0 . . $0^2\ 0^2\ 0^2\ 0^2\ 0^2$ . . $0^2$ . . $0^2$ 0 0 0 | |
| 0 | | | 1 1 0 . . $0^2\ 0^2\ 0^2\ 0^2\ 0^2$ . . $0^2$ . . $0^2$ 0 0 0 | |
| 0 | | | 1 1 0 . . $0^2\ 0^2\ 0^2\ 0^2\ 0^2$ . . $0^2$ . . $0^2$ 0 0 0 | |
| 0 | | | 1 1 0 . . $0^2\ 0^2\ 0^2\ 0^2\ 0^2$ . . $0^2$ . . $0^2$ 0 0 0 | |
| 1 | | | 0 0 1 . . $1^2\ 1^2\ 1^2\ 1^2\ 1^2$ . . $1^2$ . . $1^2$ 1 1 1 | |
| $\phi_a(\tau) =$ | 1 1 . 1 $0^2\ 0^3$ . $0^3\ 0^4$ 0 . 0 $0^2$ 0 $0^8\ 0^9\ 0^2\ 0^9\ 0^8$ 0 $0^2$ 0 . 0 $0^4\ 0^3$ . $0^3\ 0^2$ 1 . 1 1 | | | |

Compressing the summed code b signal $\epsilon_b$ in its matched filter 26 results in $\phi_b(\tau)$ being provided as,

| bit time slot # | 1 | 2 | 3 | . . . . . . . . . . . . . . . . . . . . . . . . . . . . . . . . . . . . 15 |
|---|---|---|---|---|
| Inv. 0 | 0 0 0 $0^2$ . . $0^2$ . $1^2$ . . $1^2\ 1^2\ 1^2$ . . 1 0 0 | | | |
| Seq. 1 | 1 1 1 $1^2$ . . $1^2$ . $0^2$ . . $0^2\ 0^2\ 0^2$ . . 0 1 1 | | | |
| 1 | | 1 1 1 $1^2$ . . $1^2$ . $0^2$ . . $0^2\ 0^2\ 0^2$ . . 0 1 1 | | |
| 1 | | 1 1 1 $1^2$ . . $1^2$ . $0^2$ . . $0^2\ 0^2\ 0^2$ . . 0 1 1 | | |
| 0 | | | 0 0 0 $0^2$ . . $0^2$ . $1^2$ . . $1^2\ 1^2\ 1^2$ . . 1 0 0 | |
| 1 | | | 1 1 1 $1^2$ . . $1^2$ . $0^2$ . . $0^2\ 0^2\ 0^2$ . . 0 1 1 | |
| 0 | | | 0 0 0 $0^2$ . . $0^2$ . $1^2$ . . $1^2\ 1^2\ 1^2$ . . 1 0 0 | |
| 0 | | | 0 0 0 $0^2$ . . $0^2$ . $1^2$ . . $1^2\ 1^2\ 1^2$ . . 1 0 0 | |
| $\phi_b(\tau) =$ | 0 0 . 0 $1^2\ 1^3$ . $1^3\ 1^4$ 1 . 1 $1^2$ 1 $0^8\ 0^7\ 1^2\ 0^7\ 0^8$ 1 $1^2$ 1 . 1 $1^4\ 1^3$ . $1^3\ 1^2$ 0 . 0 0 | | | |

Add the addition of $\phi_a(\tau)$ with $\phi_b(\tau)$ yields a composite lobeless impulse $\phi_T(\tau)$ which is shown below as,

| bit time slot | 1 | 2 | 3 | . . . . . . . . . . . . . . . . . . . . . . . . . . . . . . . . . . . . 15 |
|---|---|---|---|---|
| $\phi_a(\tau)$ | 1 1 . 1 $0^2\ 0^3$ . $0^3\ 0^4$ 0 . 0 $0^2$ 0 $0^8\ 0^9\ 0^2\ 0^9$ $0^8$ 0 $0^2$ 0 . 0 $0^4\ 0^3$ . $0^3\ 0^2$ 1 . 1 1 | | | |
| $\phi_b(\tau)$ | 0 0 . 0 $1^2\ 1^3$ . $1^3\ 1^4$ 1 . 1 $1^2$ 1 $0^8\ 0^7\ 1^2\ 0^7$ $0^8$ 1 $1^2$ 1 . 1 $1^4\ 1^3$ . $1^3\ 1^2$ 0 . 0 0 | | | |
| $\phi_T(\tau) =$ | . . . . . . . . . . . . . . $0^{16}\ 0^{16}$ . $0^{16}\ 0^{16}$ . . . . . . . . . . . . . . . | | | |
| | $\rightarrow\mid\Delta\mid\leftarrow$ | | | |

$\Delta = \Sigma = .5\tau$

It is seen from the above example that the additional delay $\epsilon$ does not affect $\phi_T(\tau)$. In general $\epsilon << \tau$ for a noise coded communications system. Accordingly, complete cancellation of any CW frequency in the input bandwidth can be achieved, i.e. $\infty$ db attenuation of CW interference, with no loss at all in the signal level. Since the final pulsewidth "$\tau$" is essentially doubled, then the output can be further filtered in the bandpass filter 30 having a bandwidth equal to $(1/2\tau)$ to reduce the output noise by an additional 3 db. The end result is that no loss at all is reflected in the output signal to noise ratio level while the CW interference is totally eliminated. In addition, lobeless compression is retained.

When desirable, several CW cancellers 10 of the type illustrated in FIG. 1 can be utilized in tandem to totally eliminate multiple CW interference. Each canceller would double the pulsewidth if the signal to noise ratio level is to be retained. Also, if it is desirable not to lose available compressed time slots in any specific application, then each additional canceller 10 would delay the signal by $\tau+\epsilon_i$ (rather than $2\tau+\epsilon_2$, $3\tau+\epsilon_3$, etc. ). The peak signal level would be retained but each canceller would double the noise power. In all cases, the CW interference would be attenuated by $\infty$.

It should also be mentioned that slowly varying CW can be readily accommodated by forming a closed loop whereby the output interference level would be continuously monitored and the variable delay $(\tau+\epsilon)$ adjusted until the interference was nulled in accordance with the output of some type of null detector, now shown, much in the same fashion as taught in the above referenced U.S. Pat. No. 4,027,264.

While there has been shown and described what is considered at present to be the preferred embodiment of the subject invention, the same has been made by way of illustration and not limitation. Accordingly, all alterations, modifications and changes coming within the spirit and scope of the invention, as defined in the following claims, are meant to be included.

I claim:

1. An orthogonal noise code communication system, comprising:
   means for generating and transmitting a pair of orthogonal continuous-stream multi-bit digital noise codes having respective autocorrelation functions which compress to an impulse and upon being combined compress to a lobeless impulse of a predetermined width;

means for receiving and decoding said noise coded communication signal;

means included in said receiving and decoding means for cancelling a received continuous wave interference signal, said cancelling means comprising first circuit means providing substantially no delay of said interference signal and said noise coded communication signal, second circuit means providing a predetermined time delay of said interference signal and said noise coded communication signal by a delay equal to the bit width of said lobeless impulse and a predetermined relatively small additional incremental time delay which provides a 180° phase shift of said interference signal relative to said interference signal having no delay, and third circuit means for combining the non-delayed and delayed signals from said first and second circuit means whereby said interference signal is summed and thereby eliminated and an interference free noise coded communication signal is provided for decoding; and bandpass filter means, coupled to said linear adder, having a bandwidth substantially equal to the inverse of the doubled pulsewidth of said lobeless impulse.

2. The communications system as defined by claim 1 wherein said decoding means additionally includes means for demultiplexing said multiplexed noise codes, first and second autocorrelation detector means for respectively autocorrelation detecting the pair of demultiplexed noise codes, and means for linearly combining the autocorrelation detected codes for compressing the respective autocorrelation functions to a lobeless impulse having a pulsewidth which is at least doubled the pulsewidth of one code bit width.

* * * * *